(12) United States Patent
Shi

(10) Patent No.: US 9,772,946 B2
(45) Date of Patent: Sep. 26, 2017

(54) METHOD AND DEVICE FOR PROCESSING DATA

(71) Applicant: ZTE CORPORATION, Shenzhen, Guangdong (CN)

(72) Inventor: Xinzhuo Shi, Shenzhen (CN)

(73) Assignee: ZTE Corporation (CN)

( * ) Notice: Subject to any disclaimer, the term of this patent is extended or adjusted under 35 U.S.C. 154(b) by 64 days.

(21) Appl. No.: 14/434,564

(22) PCT Filed: Sep. 27, 2013

(86) PCT No.: PCT/CN2013/084481
§ 371 (c)(1),
(2) Date: May 14, 2015

(87) PCT Pub. No.: WO2014/056405
PCT Pub. Date: Apr. 17, 2014

(65) Prior Publication Data
US 2015/0301943 A1 Oct. 22, 2015

(30) Foreign Application Priority Data
Oct. 9, 2012 (CN) .......................... 2012 1 0379871

(51) Int. Cl.
G06F 12/08 (2016.01)
G06F 12/084 (2016.01)

(52) U.S. Cl.
CPC .... *G06F 12/084* (2013.01); *G06F 2212/1021* (2013.01); *G06F 2212/281* (2013.01)

(58) Field of Classification Search
CPC ..................... G06F 12/084; G06F 13/4018
See application file for complete search history.

(56) References Cited

U.S. PATENT DOCUMENTS

2003/0037190 A1* 2/2003 Alexander .......... G06F 13/4018
710/52
2006/0088049 A1 4/2006 Kastein et al.

FOREIGN PATENT DOCUMENTS

CN 1477532 2/2004
CN 1674477 9/2005
CN 101291275 10/2008
(Continued)

OTHER PUBLICATIONS

European Patent Office, Extended European Search Report for the corresponding European Patent Application No. 13844885.7 dated Dec. 1, 2015.
(Continued)

Primary Examiner — Edward Dudek, Jr.
(74) Attorney, Agent, or Firm — Brooks Kushman P.C.

(57) ABSTRACT

A method and device are provided for processing data. The method includes, after receiving data input by a data bus, according to a destination indication of the data and a valid bit field indication of the data, writing the data input by the data bus into an uplink side shared cache, polling the uplink side shared cache according to a fixed timeslot order, reading out the data in the uplink side shared cache, and outputting the data to respective corresponding channels. The method and device enable effective saving of cache resources, reduction of pressure on area and timing, and improvement of cache utilization while reliably achieving data cache and bit width conversion.

20 Claims, 4 Drawing Sheets

(56) References Cited

FOREIGN PATENT DOCUMENTS

| | | |
|---|---|---|
| CN | 101894005 A | 11/2010 |
| CN | 102541506 A | 7/2012 |
| WO | 2009089301 A1 | 7/2009 |

OTHER PUBLICATIONS

International Search Report for PCT/CN2013/084481, English translation attached to original, Both completed by the Chinese Patent Office dated Dec. 6, 2013, All together 7 Pages, Aug. 16, 2016.
Chinese Patent Office, Search Report for corresponding CN Application No. 201210379871, dated May 24, 2017, two pages.
Chinese Patent Office, Office Action for corresponding CN Application No. 201210379871, dated Jun. 2, 2017, (Original and Translation) 13 pages total.

\* cited by examiner

METHOD AND DEVICE FOR PROCESSING DATA

CROSS-REFERENCE TO RELATED APPLICATION

This application is the U.S. national phase of PCT Application Serial No. PCT/CN2013/084481 filed Sep. 27, 2013 which claims priority to Chinese Application No. 201210379871.X filed Oct. 9, 2012, the disclosures of which are incorporated in their entirety by reference herein.

TECHNICAL FIELD

The present document relates to the field of data communications, and particularly, to a method and device for processing data.

BACKGROUND

In large-scale digital logic designs in the field of data communications, sometimes in order to enhance the processing capacity of a logic circuit or to match the bit widths of buses on both sides of the logic circuit, it is needed to perform bit width conversion on data path of the logic circuit. Taking into account that the total bandwidths on both sides of the logic circuit are not necessarily the same, or a congestion condition may occur on one side, the logic circuit also needs to be able to cache the data to be transmitted.

For example, such an application scenario is as shown in FIG. 1. On the uplink side, data are input by a data bus on one side and transmitted to Y (Y is an integer equal to or greater than 1) channels on the other side, and on the downlink side, the data are aggregated from the Y channels according to a scheduling indication and then transmitted to the data bus to output. For the data transmitted on the data bus, each data is only for one channel; in order to efficiently use the bandwidth of the respective channels, only the valid data are transmitted on the respective channels. Bit width of the data bus is A, the bus width of each device is B, and A is N times (N is an integer large than or equal to 1) B. Taking into account that the bandwidth of the data bus is not necessarily equal to the total bandwidth of respective channels and a congestion condition is likely to occur on both the data bus and respective channels, caches need to be provided on both the uplink and downlink transmission paths.

In this regard, generally the logic circuit as shown in FIG. 2 can be used to implement the data cache and bit width conversion, wherein FIFO (First In First Out) is used to perform the data cache, and a separate bit width converting and splitting circuit is used to implement the data bit width conversion. On the uplinkside, a channel identification and distribution circuit distributes the data together with the valid bit field indication of the data to the input FIFOs having a bit width of "A+the valid bit field indication width of the data" in one-to-one correspondence to respective channels according to the destination of the data on the input data bus; when a corresponding channel can receive the data input, the data are read out from the input FIFO, and the valid portion of the data is converted by the bit width converting and splitting circuit into a data stream with a bit width of B according to the valid bit field indication of the data, and sent to the corresponding channel. On the downlink side, the bit width converting and splicing circuit first converts the data transmitted from the respective channels into data with a bit width of A, and then writes the data into the output FIFOs in one-to-one correspondence to the respective channels; when the data bus can receive data, the data selection and aggregation circuit reads out the data from the respective output FIFOs according to a scheduling order, and aggregates and outputs the data to the output data bus.

Wherein, the bit width converting and splitting circuit which implements the data bit width conversion mainly consists of a de-multiplexer (DMUX) whose working mode is as follows:

For each channel, after the data with a bit width of A and the valid bit field indication of the data are read out from the input FIFOs, they are first stored in a register. The bit width converting and splitting circuit selects and outputs the data with a width of B in its first portion in the first cycle, and outputs the data with a width of B adjacent to the last data in the second cycle, and until all the valid data are scheduled to output, the bit width converting and splitting circuit turns to the next data read out from the input FIFOs, and continues to perform the bit width conversion according to the above-mentioned mode.

The bit width converting and splicing circuit basically is a reverse process of the bit width converting and splitting circuit, and mainly consists of a multiplexer (MUX) whose working mode is as follows:

For each channel, after the data with a bit width of B are output from the channels, they are spliced together by the bit width converting and splicing circuit into data with a width of A according to the outputting order, and written into the corresponding output FIFOs.

In this method, if only a portion of bit fields in the data input by the uplink side data bus or the data (with the bit width all being A) output from the respective channels on the downlink side and spliced together by the bit width converting and splicing circuit are valid, when being stored into the FIFO, this data still needs to occupy a width of "A+the valid bit field indication width of the data", which is exactly the same as the case where all the bit fields of this data are valid, resulting in its relatively low cache utilization.

In addition, taking into account the specific implementation of the circuit: if the FPGA (Field Programmable Gate Array) mode is used to implement this circuit, because the bit width of the Block RAM (block random access memory) for achieving the FIFO in the FPGA is limited, and its length is much greater than its width (take the Virex-5 FPGA in Xilinx for example, the maximum configuration bit width of a 36 kb Block RAM can only reach 36 bits), taking into account that this method needs to use Y FIFOs with the bit width of "A+valid bit field indication width of the data", when the data bus width A is relatively large, using the FPGA mode needs to splice the bit widths of a plurality of Block RAMs to achieve each FIFO. So a considerable amount of Block RAM resources will be consumed and a large design area will be occupied, especially when the number of channels Y is relatively large. Even if the ASIC is used to implement the related logic circuit, the FIFO with such a large bit width will bring pressures to the back-end in terms of layout and timing delay and also occupy a large design area.

SUMMARY

The technical problem to be solved by the present document is to provide a method and device for processing data, to save cache resources and improve cache utilization while reliably achieving data cache and bit width conversion.

To solve the abovementioned technical problem, the present document provides a method for processing data, comprising:

after receiving data input by a data bus, according to a destination indication of the data and a valid bit field indication of the data, writing the data input by the data bus into an uplink side shared cache;

polling the uplink side shared cache according to a fixed timeslot order, reading out data in the uplink side shared cache, and outputting the data to respective corresponding channels.

Preferably, the above method may have the following characteristics: the uplink side shared cache consists of N pieces of random access memory (RAM) with a specified bit width, and each piece of RAM is logically divided into Y RAM segments, said polling the uplink side shared cache according to a fixed timeslot order and reading out data in the uplink side shared cache comprises the following manners:

when N≥Y, each polling cycle is N timeslots, and Y RAM segments are accessed in each timeslot;

when N<Y, each polling cycle is Y timeslots, and N RAM segments are accessed in each timeslot.

Preferably, the above method further has the following characteristics: in the process of writing the data input by the data bus into an uplink side sharing cache, it further comprises:

recording a write-in position of tail of current data according to channels.

To solve the abovementioned problem, the present document further provides a device for processing data, comprising:

an uplink side write-in control module, configured to: after receiving data input by a data bus, according to a destination indication of the data and a valid bit field indication of the data, write the data input by the data bus into an uplink side shared cache;

an uplink side read-out control module, configured to: poll according to a fixed timeslot order to read out the data in the uplink side shared cache, and output the data to respective corresponding channels.

Preferably, the above device further comprises the following characteristics:

the uplink side shared cache consists of N pieces of random access memory (RAM) with a specified bit width, and each piece of RAM is logically divided into Y RAM segments, the uplink side read-out control module is configured to poll according to a fixed timeslot order to read out the data in the uplink side shared cache in the following manners: when N≥Y, each polling cycle has N timeslots, and Y RAM segments are accessed in each timeslot; when N<Y, each polling cycle has Y timeslots, and N RAM segments are accessed in each timeslot.

Preferably, the above device further comprises the following characteristics:

the uplink side write-in control module is further configured to, in the process of writing the data input by the data bus into the uplink side shared cache, record the write-in position of tail of current data according to channels.

To solve the abovementioned problem, the present document further provides a method for processing data, comprising:

storing data output by respective channels into a downlink side shared cache;

reading out the data from the downlink side shared cache according to a scheduling order, and outputting the data to a data bus.

Preferably, the above method further has the following characteristics:

the downlink side shared cache consists of N pieces of random access memory (RAM) with a specified bit width, and each piece of RAM is divided logically into Y RAM segments, said storing data output by respective channels into a downlink side shared cache comprises:

polling respective RAM segments in respective RAM pieces in the downlink side shared cache according to a fixed timeslot order, and if a RAM segment column currently being polled has spare space, storing the data to be output in a corresponding channel into the RAM segment column.

Preferably, the above method further has the following characteristics: said polling respective RAM segments in respective RAM pieces in the downlink side shared cache according to a fixed timeslot order comprises the following manners:

when N≥Y, each polling cycle has N timeslots, and Y RAM segments are accessed in each timeslot; when N<Y, each polling cycle has Y timeslots, and N RAM segments are accessed in each timeslot.

Preferably, the above method further has the following characteristics: said reading out data from the downlink side shared cache according to a scheduling order comprises:

calculating an overall amount of data cached in each RAM segment column, and when the amount of data cached in the RAM segment column is greater than or equal to the amount of data required by the current scheduling indication, reading out the data output in the current scheduling from respective RAM segments based on a scheduling bit field length indication.

To solve the abovementioned problem, the present document further provides a device for processing data, comprising:

a downlink side write-in control module, configured to: store data output by respective channels into a downlink side shared cache;

a downlink side read-out control module, configured to: read out the data from the downlink side shared cache according to a scheduling order, and output the data to a data bus.

Preferably, the above device further comprises the following characteristics:

the downlink side shared cache consists of N pieces of random access memory (RAM) with a specified bit width, and each piece of RAM is divided logically into Y RAM segments, the downlink side write-in control module is configured to: poll respective RAM segments in respective RAM pieces in the downlink side shared cache according to a fixed timeslot order, and if a RAM segment column currently being polled has spare space, store the data to be output in a corresponding channel into the RAM segment column.

Preferably, the above device further comprises the following characteristics:

the downlink side write-in control module is configured to poll respective RAM segments in respective RAM pieces in the downlink side shared cache according to a fixed timeslot order in the following manners: when N≥Y, each polling cycle has N timeslots, and Y RAM segments are accessed in each timeslot; when N<Y, each polling cycle has Y timeslots, and N RAM segments are accessed in each timeslot.

Preferably, the above device further comprises the following characteristics:

the downlink side read-out control module is configured to: calculate an overall amount of data cached in each RAM segment column, and when the amount of data cached in the RAM segment column is greater than or equal to the amount of data required by a current scheduling indication, read out the data output in the current scheduling from respective RAM segments based on an scheduling bit field length indication.

In summary, the embodiments of the present document provide a method and device for processing data to enable effective saving of cache resources, reduction of pressure on the area and timing and improvement of cache utilization while reliably achieving the data cache and bit width conversion.

BRIEF DESCRIPTION OF THE DRAWINGS

Hereinafter, the accompanying drawings needed in the description of the embodiments and the prior art will be introduced briefly. Obviously, the accompanying drawings in the following description are only some embodiments of the present document, and for a person skilled in the art, on the premise of not paying creative efforts, other accompanying drawings cannot be obtained according to these accompanying drawings.

PREFERRED EMBODIMENTS OF THE DOCUMENT

Hereinafter in conjunction with the accompanying drawings, the embodiments of the present document will be described in detail. It should be noted that, in the case of no conflict, embodiments and features in the embodiments of the present application may be combined randomly with each other.

Figure 1:
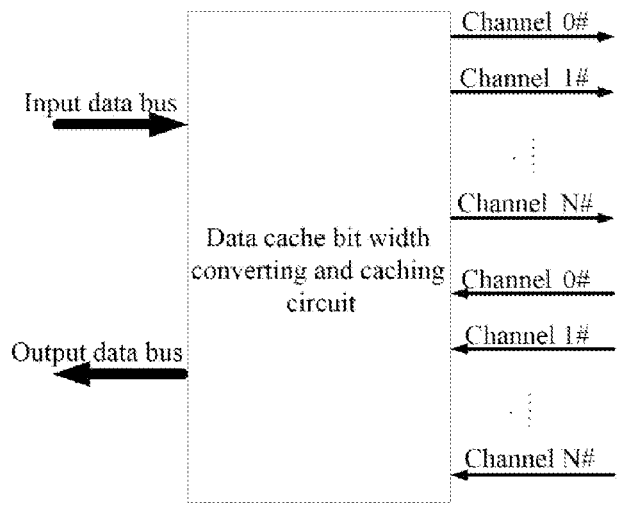
FIG. 1 is a schematic diagram of an application scenario of a data cache bit width conversion circuit.
Figure 2:
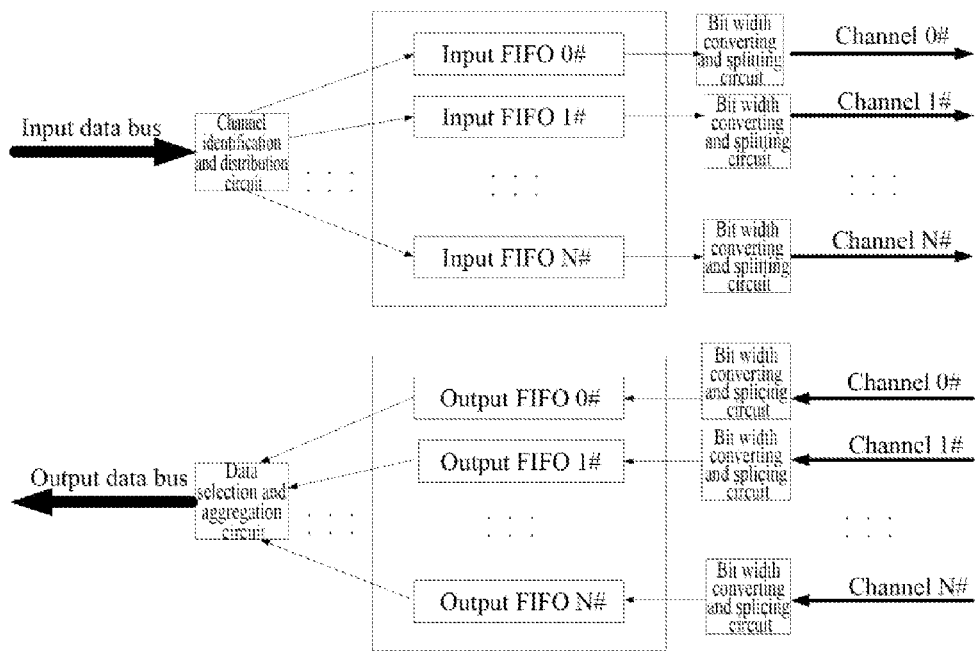
FIG. 2 is a structural diagram of a data cache bit width converting and caching circuit in the prior art.
Figure 3:
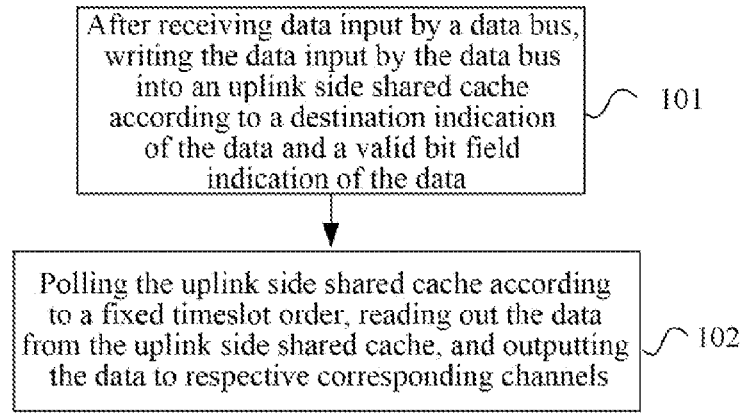
FIG. 3 is a flow chart of a method for processing data in an uplink side direction in accordance with one embodiment of the present document.

FIG. 3 is a flow chart of a method for processing data in an uplink side direction in accordance with one embodiment of the present document, and as shown in FIG. 3, the method of the present embodiment comprises:

Step 101, in an uplink side direction, after receiving data input by the data bus, according to a destination indication of the data and a valid bit field indication of the data, writing the data input by the data bus into an uplinkside shared cache;

wherein, the destination indication and the valid bit field indication of the current data are provided at the same time when the data are input by the data bus. According to the destination indication and the valid bit field indication of the data, the data input by the data bus are stored into respective RAM segments in respective RAM pieces in the uplinkside shared cache.

Step 102, polling the uplinkside shared cache according to a fixed timeslot order, reading out the data in the uplinkside shared cache, and outputting the data to corresponding channels.

It is to poll respective RAM segments in respective RAM pieces in the uplinkside shared cache according to a fixed timeslot order, and if a RAM segment currently being polled is not empty and a corresponding output channel can receive data, then it is to read out the data in the RAM segment currently being polled and output the data to the corresponding channel.

In the step 101, the "destination indication" which synchronizes with data is used to indicate the number of the channel for which the data is destined, and the "valid bit field indication" which synchronizes with data is used to indicate how many portions (usually measured with the channel bit width B, namely the RAM bit width, as unit) in the current data are valid. In the step 102, when storing the data into the uplinkside shared cache, the write-in control module needs to record the write-in position of the tail of the current data according to channels as the basis of writing in the next data destined for the same channel.

Figure 4:
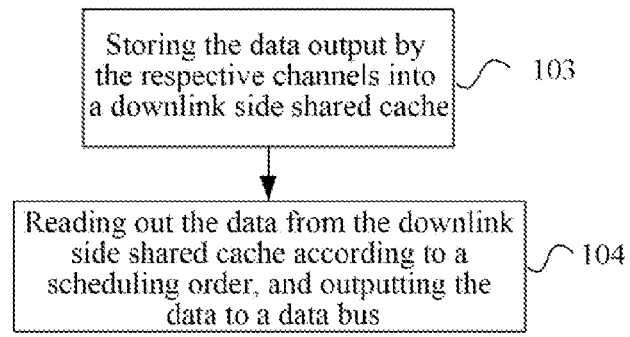
FIG. 4 is a flow chart of a method for processing data in a downlink side direction in accordance with one embodiment of the present document.

FIG. 4 is a flow chart of a method for processing data in a downlink side direction in accordance with one embodiment of the present document, and as shown in FIG. 4, the method of the present embodiment comprises:

Step 103, in the downlink side direction, storing the data output by the respective channels into a downlink side shared cache;

when a channel has data to be outputted, and the RAM segments in the corresponding downlink side shared cache have spare space, the data are output through the channel via the control of the downlink side write-in control module, and stored in respective RAM segments in respective RAM pieces in the downlink side shared cache.

Step 104, reading out the data from the downlink side shared cache according to a scheduling order, and outputting the data to a data bus.

It is to access the respective RAM segments in respective RAM pieces in the downlink side shared cache according to a scheduling order, and aggregate and output the data to the data bus.

Figure 5:
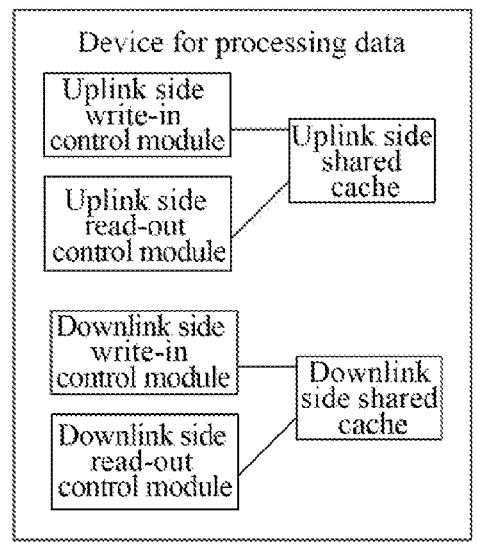
FIG. 5 is a schematic diagram of a device for processing data in accordance with one embodiment of the present document.

FIG. 5 is a schematic diagram of a device for processing data in accordance with one embodiment of the present document, and as shown in FIG. 5, it comprises the following modules:

an uplinkside write-in control module, an uplinkside read-out control module, an uplink side shared cache, a downlink side write-in control module, a downlink side read-out control module and a downlink side shared cache. Wherein, the uplink and downlink shared caches are used for implementing the data cache function, and the uplink and downlink bit width read-out and write-in control modules and the uplinkand downlink shared caches jointly achieve the bit width conversion of the data.

By dividing according to data flow direction, the uplink side (from the data bus to respective channels) comprises the following parts:

an uplinkside write-in control module used to, after receiving data input by a data bus, according to a destination indication of the data and a valid bit field indication of the data, write the data input by the data bus into an uplink side shared cache;

an uplink side read-out control module used to poll the uplink side shared cache according to a fixed timeslot order, read out the data in the uplink side shared cache, and output the data to respective channels;

an uplink side shared cache consisting of N pieces of random access memory (RAM) with a bit width of B, and each piece of RAM is logically divided into Y RAM segments for storing the data to be output to respective channels.

Wherein, the uplink side read-out control module polls in accordance with a fixed timeslot order to read out the data in the uplink side shared cache in the following manners: when N≥Y, each polling cycle is N timeslots, and Y RAM segments are accessed in each timeslot; when N<Y, each polling cycle is Y timeslots, and N RAM segments are accessed in each timeslot.

Wherein, the uplinkside write-in control module is further used to, in the process of writing the data input by the data bus into the uplink side shared cache, record the write-in position of the tail of the current data according to channels.

By dividing according to data flow direction, the downlink side (from respective channels to the data bus) comprises the following parts:

a downlinkside write-in control module used to store the data output by respective channels into a downlink side shared cache;

a downlinkside read-out control module used to read out the data from the downlinkside shared cache according to a scheduling order and output the data to the data bus;

a downlink side shared cache consisting of N pieces of random access memory (RAM) with a bit width of B, and each piece of RAM is divided logically into Y RAM segments for storing the data to be output to the data bus.

Wherein, the downlinkside write-in control module is specifically used to poll respective RAM segments in respective RAM pieces in the downlinkside shared cache according to a fixed timeslot order, and if a RAM segment column currently being polled has spare space, store the data to be output by a corresponding channel into the RAM segment column.

Wherein, the downlinkside write-in control module polls respective RAM segments in respective RAM pieces in the downlink end shared cache according to a fixed timeslot order in the following manners: when N≥Y, each polling cycle is N timeslots, and Y RAM segments are accessed in each timeslot; when N<Y, each polling cycle is Y timeslots, and N RAM segments are accessed in each timeslot.

Wherein, the downlink side read-out control module is specifically used to calculate an overall amount of data cached in each RAM segment column, and when the amount of data cached in the RAM segment column is greater than or equal to the amount of data required by the current scheduling indication, read out the data output in the current scheduling from the respective RAM segments based on a scheduling bit field length indication.

Hereinafter in conjunction with the accompanying drawings and specific embodiments, the present document will be further described in detail. The described embodiments are merely part of embodiments, but not all of embodiments of the present document. Based on the embodiments of the present document, all other embodiments obtained by those skilled in the art without creative efforts should belong to the protection scope of the present document.

The present document employs a mode of operating a shared cache according to a fixed timeslot order to achieve bit width conversion of the data, and employs a mode of splicing and storing the valid data to achieve improvement of cache efficiency, so as to solve the problems in the prior art that the cache utilization is not high, and that too many logic resources and design area are occupied when implementing the FPGA.

Figure 6:
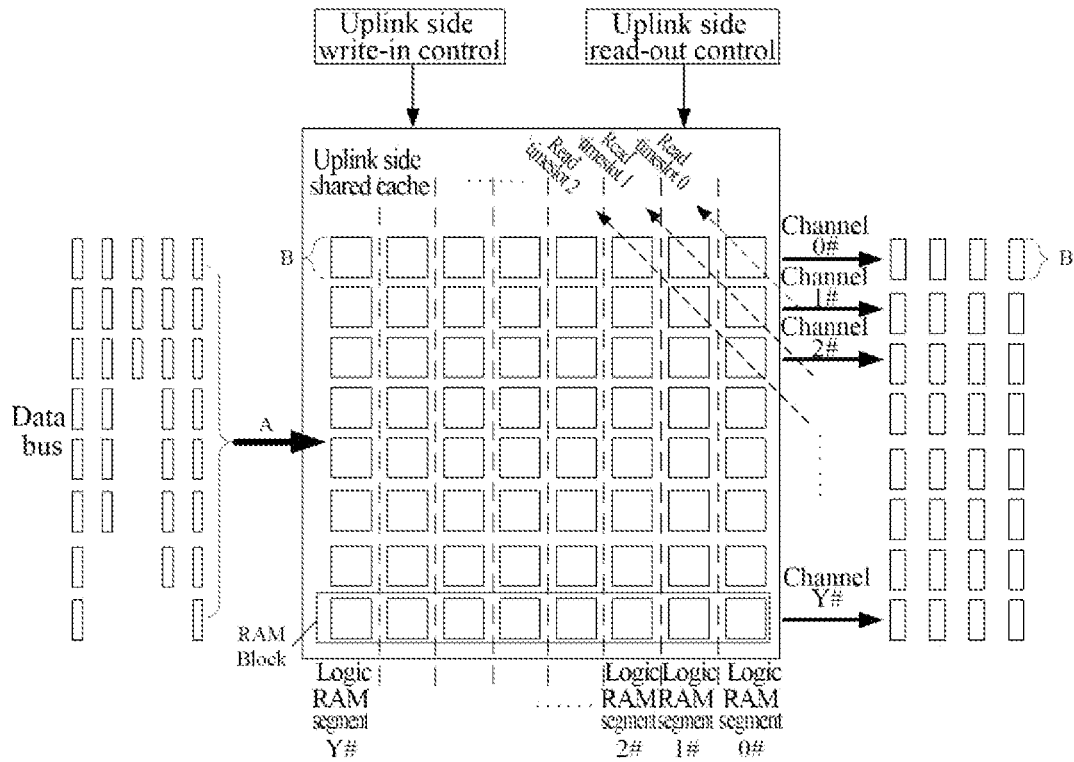
FIG. 6 is a schematic diagram of an uplink side transmission process in accordance with one embodiment of the present document.
Figure 7:
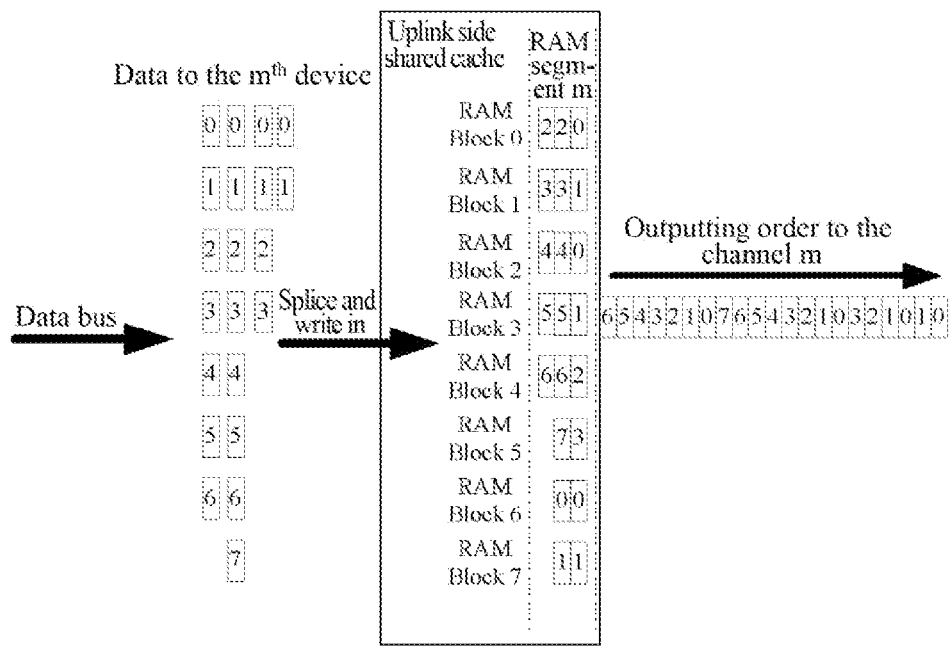
FIG. 7 is a schematic diagram of a single channel uplink side transmission process in accordance with one embodiment of the present document.
Figure 8:
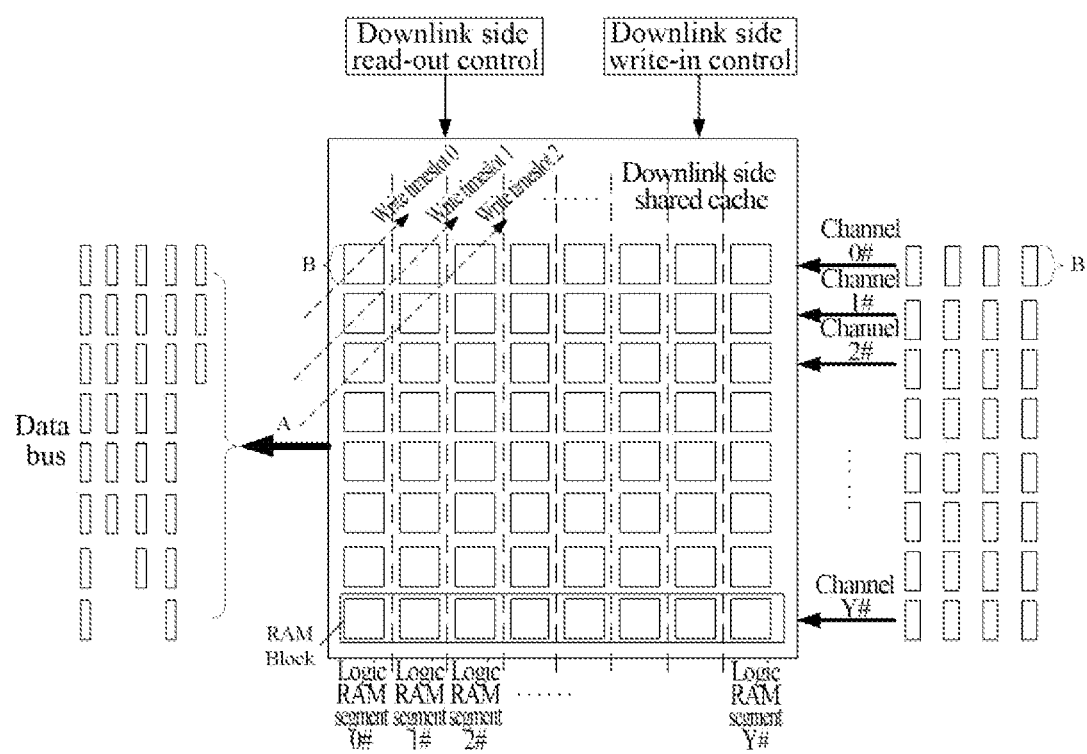
FIG. 8 is a schematic diagram of a downlink side transmission process in accordance with one embodiment of the present document.

The block diagrams for implementing the embodiments of the present document are shown in FIG. 6, FIG. 7 and FIG. 8. Wherein, the uplink and downlink shared caches both consist of N pieces of simple dual-port RAM, and each piece of RAM is logically divided into Y RAM segments. The RAM segments in the same column correspond to the same channel, and are called a RAM segment column. The shared cache divides an address range for each logical RAM segment, and in the process of performing reading or writing operation on the shared cache, respective RAM segments are distinguished through the reading and writing addresses; each logical RAM segment is read and write controlled according to a fixed timeslot, and when it is selected and the read enable is pulled up, the data in the first portion of the RAM segment are output, and when it is selected and the write enable is to pulled up, the data are written into the end portion of the RAM segment.

For simplicity and convenience, in the following, the working process of the present document is described in detail only taking the case of N=Y=8 as an example:

the entire write-in and read-out processes on the uplink side are shown in FIG. 6.

The write-in process on the uplink side:

As shown in FIG. 6, on the uplink side, the destination indication which synchronizes with the data transmitted on the data bus indicates the number of the channel for which the current data is destined; the valid bit field indication which synchronizes with the data indicates taking the RAM piece bit width B as unit to measure how many portions in the current data from the upper bit are valid.

After each data is written in completely, the uplink side write-in control module will record the current write-in end position (written to which RAM segment in the RAM segment column) for the written RAM segment column. In each write-in, the uplink side write-in control module selects a corresponding RAM segment column according to the destination indication, and then takes the RAM segment column of "the last write-in end position+1" as the start position of the current write-in, and according to the valid bit field indication of the data, determine to pull up the write enable of the "valid bit field" RAM pieces in turn from the start position of the current write-in. The valid data on the data bus will also be sequentially sent to the respective RAM segments currently selected from the start position of the current write-in.

In this example, as shown in FIG. 7, the valid bit field lengths of the second data and the third data that are sequentially destined for the channel m# are 4B and 8B, respectively. Before writing in the second data, the write-in end position of the RAM segment column m# corresponding to the channel m# is RAM segment 1#. When writing in the second data, the data is sequentially stored into RAM segment 2#~RAM segment 5# from the beginning to the end, and after the write-in is completed, the write-in end position of the RAM segment column m# is updated as RAM segment 5#; when writing in the third data, the data is sequentially stored from the beginning to the end into RAM segment 6#, RAM segment 7#, RAM segment 0#, RAM segment 1 0#, RAM segment 2#, RAM segment 3#, RAM segment 4# and RAM segment 5#, and after the write-in is completed, the write-in end position of the RAM segment column m# is updated as RAM segment 5#.

The read-out process on the uplink side:

The uplink side read-out control module polls respective RAM segments in respective RAM pieces in the uplink side shared cache in a fixed order according to timeslot. When N≥Y, each polling cycle is N timeslots, and Y RAM segments are accessed in each timeslot; when N<Y, each polling cycle is Y timeslots, and N RAM segments are accessed in each timeslot. For the same RAM segment column, two upper and lower adjacent RAM segments are sequentially accessed in two adjacent timeslots. In this case, its polling order is shown as follows:

in read timeslot 0: it is to access RAM segment 0, RAM group 0; RAM segment 1, RAM group 7; RAM segment 2, RAM group 6; RAM segment 3, RAM group 5; RAM segment 4, RAM group 4; RAM segment 5, RAM group 3; RAM segment 6, RAM group 2; RAM segment 7, and RAM group 1.

In read timeslot 1: it is to access RAM segment 0, RAM group 1; RAM segment 1, RAM group 0; RAM segment 2, RAM group 7; RAM segment 3, RAM group 6; RAM segment 4, RAM group 5; RAM segment 5, RAM group 4; RAM segment 6, RAM group 3; RAM segment 7, RAM group 2.

In read timeslot 2: it is to access RAM segment 0, RAM group 2; RAM segment 1, RAM group 1; RAM segment 2, RAM group 0; RAM segment 3, RAM group 7; RAM segment 4, RAM group 6; RAM segment 5, RAM group 5; RAM segment 6, RAM group 4; RAM segment 7, RAM group 3.

In read timeslot 3: it is to access RAM segment 0, RAM group 3; RAM segment 1, RAM group 2; RAM segment 2, RAM group 1; RAM segment 3, RAM group 0; RAM segment 4, RAM group 7; RAM segment 5, RAM group 6; RAM segment 6, RAM group 5; RAM segment 7, RAM group 4.

In read timeslot 4: it is to access RAM segment 0, RAM group 4; RAM segment 1, RAM group 3; RAM segment 2, RAM group 2; RAM segment 3, RAM group 1; RAM segment 4, RAM group 0; RAM segment 5, RAM group 7; RAM segment 6, RAM group 6; RAM segment 7, RAM group 5.

In read timeslot 5: it is to access RAM segment 0, RAM group 5; RAM segment 1, RAM group 4; RAM segment 2, RAM group 3; RAM segment 3, RAM group 2; RAM segment 4, RAM group 1; RAM segment 5, RAM group 0; RAM segment 6, RAM group 7; RAM segment 7, RAM group 6.

In read timeslot 6: it is to access RAM segment 0, RAM group 6; RAM segment 1, RAM group 5; RAM segment 2, RAM group 4; RAM segment 3, RAM group 3; RAM segment 4, RAM group 2; RAM segment 5, RAM group 1; RAM segment 6, RAM group 0; RAM segment 7, RAM Group 7.

In read timeslot 7: it is to access RAM segment 0, RAM group 7; RAM segment 1, RAM group 6; RAM segment 2, RAM group 5; RAM segment 3, RAM group 4; RAM segment 4, RAM group 3; RAM segment 5, RAM group 2; RAM segment 6, RAM group 1; RAM segment 7, RAM group 0.

On the uplink side, each RAM segment column will record its last read-out end position, and if the position of a RAM segment currently being polled is "the last read-out end position of the RAM segment column+1", and the RAM segment is not empty and meanwhile its corresponding output channel can receive data, then the read enable of the RAM piece where the RAM segment is located is pulled high, and the data read out at this time are sent to a channel corresponding to the RAM; and in the other cases, no data is output.

The entire write-in and read-out processes on the downlink side are shown as FIG. 8.

The write-in process on the downlink side:

The downlink side write-in control module polls respective RAM segments in respective RAM pieces in the downlink side shared cache in a fixed order according to timeslot, and its order is the same as the read timeslot polling order on the uplink side. When N≥Y, each polling cycle is N timeslots, and Y RAM segments are accessed in each timeslot; when N<Y, each polling cycle is Y timeslots, and N RAM segments are accessed in each timeslot.

The downlink side write-in control module records the last write-in position for each RAM segment column. If the position of a RAM segment currently being polled is "the last write-in position of the RAM segment column+1", and the RAM segment has spare space and meanwhile its corresponding channel has data to output, then the write enable of the RAM piece where the RAM segment is located is pulled up, and the data input from the corresponding channel are sent to the RAM segment; and in the other cases, no data write-in operation is performed.

The read-out process on the downlinkside:

The downlink side read-out control module calculates an overall amount of cached data for each RAM segment column, and when the amount of data cached in the RAM segment column is greater than or equal to the amount of data required by the current scheduling indication, the downlink side read-out control module initiates a read-out operation, and meanwhile provides a scheduling bit field length indication (by taking the RAM piece bit width as the measuring unit).

The downlinkside read-out control module records the last read-out end position for each RAM segment column. When initiating a read operation, the downlinkside read-out control module takes the RAM segment of "the last read-out end position of the RAM segment column+1" as the start position of the RAM segment, and reads out the data output in the current scheduling from respective RAM segments according to a scheduling bit field length indication, and sends the data to the data bus to output.

From the description of the abovementioned embodiments, it can be seen that, when implementing data bit width conversion and caching functions, since the valid data is cached by means of splicing in the uplink and downlink side write-in processes, its cache utilization is higher than the solution in the Background of the Related Art. In addition, since N caches with a width of B are used in the implementation, and if the data bus A is much greater than B, the on-chip cache resources can be effectively utilized in specific implementation, thus reducing the design area and timing delay, which is especially apparent when the number of channels Y is relatively large.

Those ordinarily skilled in the art can understand that all or part of steps of the abovementioned method may be completed by programs instructing the relevant hardware, and the abovementioned programs may be stored in a computer-readable storage medium, such as read only memory, magnetic or optical disk. Alternatively, all or part of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The above description is only preferred embodiments of the present document, and of course, the present document may have a variety of other embodiments, and without departing from the spirit and essence of the present document, a person skilled in the art can make various corresponding changes and modifications according to the present document, and these corresponding changes and modifications should belong to the protection scope of the appended claims of the present document.

INDUSTRIAL APPLICABILITY

Compared with the prior art, the embodiments of the present document have the following advantages:

The method and device provided in the embodiments of the present document only perform cache and bit width conversion for valid bit fields in the data when processing data, and its cache utilization and transmission efficiency are relatively high; and since its implementation uses N RAM pieces with a bit width of B, when the bit width of the data bus is relatively large and the FPGA is used to implement, the on-chip RAM resources can be effectively used to reduce the design area. So the problems and shortcomings in the prior art that the cache utilization is relatively low, a lot of cache resources are consumed in the specific implementation, and the pressures on the area and timing are too much are overcome.

What is claimed is:

1. A method for processing data, comprising:
   after receiving data input by a data bus, according to a destination indication of the data and a valid bit field indication of the data, writing the data input by the data bus into an uplink side shared cache; wherein the uplink side shared cache consists of N pieces of random access memory (RAM) with a specified bit width, and each piece of RAM is logically divided into Y RAM segments; wherein N is an integer equal to or greater than 1 and Y is an integer equal to or greater than 1; the RAM segments in a same column correspond to a same channel, and are called a RAM segment column; wherein the RAM segments in a same column comprise all RAM segments having a same RAM segment number in each of the N pieces of RAM, the destination indication of the data indicates a number of the channel for which the current data is destined; the valid bit field indication of the data indicates a number of how many portions in the current data from the upper bit are valid; wherein the number of how many portions in the current data refers to bow many units in the current data, wherein one unit comprises a definite bit width data and the definite bit width is same as the specified bit width of the RAM piece;
   polling respective RAM segments in respective RAM pieces in the uplink side shared cache according to a fixed order in every polling cycle, and if a RAM segment currently being polled is not empty and a corresponding output channel can receive data, then reading out the data in the RAM segment currently being polled and outputting the data to the corresponding channel.

2. The method of claim 1,
   said polling the uplink side shared cache according to a fixed timeslot order and reading out data in the uplink side shared cache comprises the following manners:
   when N≥Y, each polling cycle has N timeslots, and Y RAM segments are accessed in each timeslot;
   when N<Y, each polling cycle has Y timeslots, and N RAM segments are accessed in each timeslot.

3. The method of claim 2, in the process of writing the data input by the data bus into an uplink side shared cache, further comprising:
   recording a write-in position of tail of current data in the corresponding segment column according to channels.

4. The method of claim 1, further comprising:
   storing data output by respective channels into a downlink side shared cache;
   reading out the data from the downlink side shared cache according to a scheduling order, and outputting the data to a data bus.

5. The method of claim 4, wherein,
   the downlink side shared cache consists of N pieces of random access memory (RAM) with a specified bit width, and each piece of RAM is divided logically into Y RAM segments,
   said storing data output by respective channels into a downlink side shared cache comprises:
   polling respective RAM segments in respective RAM pieces in the downlink side shared cache according to a fixed timeslot order, and if a RAM segment column currently being polled has spare space, storing the data to be output in a corresponding channel into the RAM segment column.

6. The method of claim 5, wherein, said reading out the data from the downlink side shared cache according to a scheduling order comprises:
   calculating an overall amount of data cached in each RAM segment column, and when the amount of data cached in the RAM segment column is greater than or equal to the amount of data required by a current scheduling indication, reading out the data output in the current scheduling from respective RAM segments based on a scheduling bit field length indication.

7. The method of claim 5, wherein, said polling respective RAM segments in respective RAM pieces in the downlink side shared cache according to a fixed timeslot order comprises the following manners:
   when N≥Y, each polling cycle has N timeslots, and Y RAM segments are accessed in each timeslot; when N<Y, each polling cycle has Y timeslots, and N RAM segments are accessed in each timeslot.

8. The method of claim 7, wherein, said reading out the data from the downlink side shared cache according to a scheduling order comprises:
   calculating an overall amount of data cached in each RAM segment column, and when the amount of data cached in the RAM segment column is greater than or equal to the amount of data required by a current scheduling indication, reading out the data output in the current scheduling from respective RAM segments based on a scheduling bit field length indication.

9. The method of claim 4, wherein,
   said reading out the data from the downlink side shared cache according to a scheduling order comprises:
   calculating an overall amount of data cached in each RAM segment column, and when the amount of data cached in the RAM segment column is greater than or equal to the amount of data required by a current scheduling indication, reading out the data output in the current scheduling from respective RAM segments based on a scheduling bit field length indication.

10. The method of claim 1, in the process of writing the data input by the data bus into an uplink side shared cache, further comprising:

recording a write-in position of tail of current data in the corresponding segment column according to channels.

11. A device for processing data, comprising:

an uplink side write-in control module, configured to: after receiving data input by a data bus, according to a destination indication of the data and a valid bit field indication of the data, write the data input by the data bus into an uplink side shared cache; wherein the uplink side shared cache consists of N pieces of random access memory (RAM) with a specified bit width, and each piece of RAM is logically divided into Y RAM segments; wherein N is an integer equal to or greater than 1 and Y is an integer equal to or greater than 1, the RAM segments in a same column correspond to a same channel, and are called a RAM segment column; wherein the RAM segments in a same column comprise all RAM segments having a same RAM segment number in each of the N pieces of RAM; the destination indication of the data indicates a number of the channel for which the current data is destined; the valid bit field indication of the data indicates a number of how many portions in the current data from the upper bit are valid; wherein the number of how many portions in the current data refers to how many units in the current data, wherein one unit comprises a definite bit width data and the definite bit width is same as the specified bit width of the RAM piece;

an uplink side read-out control module, configured to: poll respective RAM segments in respective RAM pieces in the uplink side shared cache according to a fixed order in every polling cycle, and if a RAM segment currently being polled is not empty and a corresponding output channel can receive data, then read out the data in the RANI segment currently being polled and output the data to the corresponding channel.

12. The device of claim 11, wherein, the uplink side read-out control module is configured to poll according to a fixed timeslot order to read out the data in the uplink side shared cache in the following manners: when N≥Y, each polling cycle has N timeslots, and Y RAM segments are accessed in each timeslot; when N<Y, each polling cycle has Y timeslots, and N RAM segments are accessed in each timeslot.

13. The device of claim 12, wherein, the uplink side write-in control module is further configured to, in the process of writing the data input by the data bus into the uplink side shared cache, record the write-in position of tail of current data in the corresponding segment column according to channels.

14. The device of claim 11, further comprising:

a downlink side write-in control module, configured to: store data output by respective channels into a downlink side shared cache;

a downlink side read-out control module, configured to: read out the data from the downlink side shared cache according to a scheduling order, and output the data to a data bus.

15. The device of claim 14, wherein, the downlink side shared cache consists of N pieces of random access memory (RAM) with a specified bit width, and each piece of RAM is divided logically into Y RAM segments, the downlink side write-in control module is configured to: poll respective RAM segments in respective RAM pieces in the downlink side shared cache according to a fixed timeslot order, and if a RAM segment column currently being polled has spare space, store the data to be output in a corresponding channel into the RAM segment column.

16. The device of claim 15, wherein, the downlink side read-out control module is configured to: calculate an overall amount of data cached in each RAM segment column, and when the amount of data cached in the RAM segment column is greater than or equal to the amount of data required by a current scheduling indication, read out the data output in the current scheduling from respective RAM segments based on an scheduling bit field length indication.

17. The device of claim 15, wherein, the downlink side write-in control module is configured to poll respective RAM segments in respective RAM pieces in the downlink side shared cache according to a fixed timeslot order in the following manners: when N≥Y, each polling cycle has N timeslots, and Y RAM segments are accessed in each timeslot; when N<Y, each polling cycle has Y timeslots, and N RAM segments are accessed in each timeslot.

18. The device of claim 17, wherein, the downlink side read-out control module is configured to: calculate an overall amount of data cached in each RAM segment column, and when the amount of data cached in the RAM segment column is greater than or equal to the amount of data required by a current scheduling indication, read out the data output in the current scheduling from respective RAM segments based on an scheduling bit field length indication.

19. The device of claim 14, wherein, the downlink side read-out control module is configured to: calculate an overall amount of data cached in each RAM segment column, and when the amount of data cached in the RAM segment column is greater than or equal to the amount of data required by a current scheduling indication, read out the data output in the current scheduling from respective RAM segments based on an scheduling bit field length indication.

20. The device of claim 11, wherein, the uplink side write-in control module is further configured to, in the process of writing the data input by the data bus into the uplink side shared cache, record the write-in position of tail of current data in the corresponding segment column according to channels.

* * * * *